Aug. 1, 1950 J. COUGNARD 2,517,087
APPARATUS FOR THE PROTECTION OF HIGH-VOLTAGE ELECTRIC
INSTALLATIONS AGAINST HIGH-FREQUENCY
ATMOSPHERIC DISCHARGES
Filed Oct. 22, 1946 2 Sheets-Sheet 1
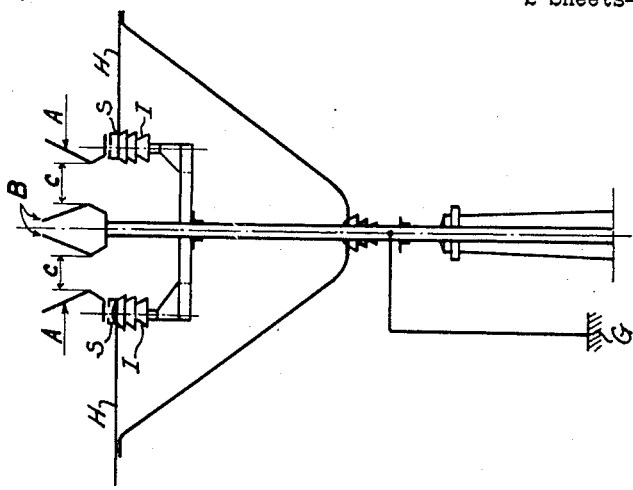
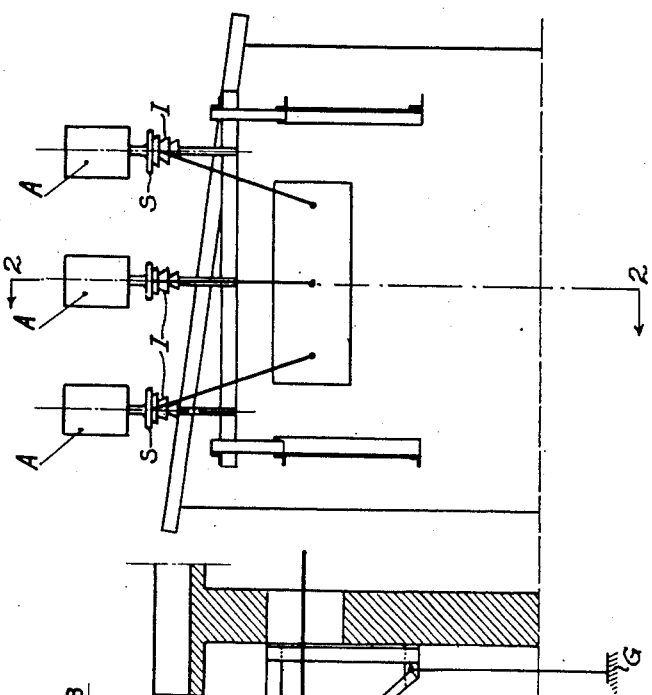
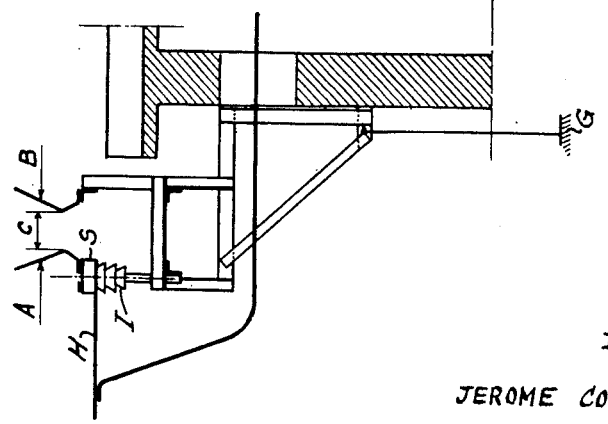
INVENTOR
JEROME COUGNARD
BY
Atty.

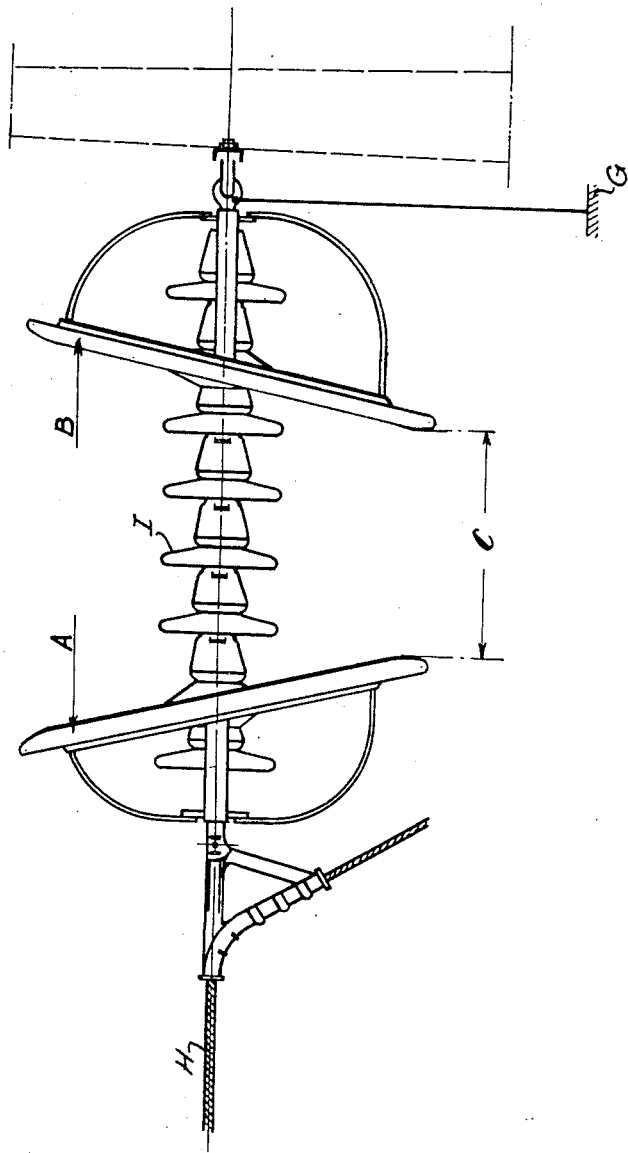

Patented Aug. 1, 1950

2,517,087

UNITED STATES PATENT OFFICE 2,517,087

APPARATUS FOR THE PROTECTION OF HIGH-VOLTAGE ELECTRIC INSTALLATIONS AGAINST HIGH-FREQUENCY ATMOSPHERIC DISCHARGES

Jérôme Cougnard, Nanterre, France

Application October 22, 1946, Serial No. 704,844
In France October 31, 1945

6 Claims. (Cl. 175—30)

The present invention relates to lightning protection means and, more particularly, the protection of electric transmission lines and apparatus against the destructive effects initiated in said lines by lightning discharges.

Protection of electric transmission networks against the tremendous forces of nature, called lightning protection, has been a long-sought problem the solution of which is apparently not simple, as evidenced by the numerous patents and suggestions on the subject, said problem being complicated by the fact that, until lately, the elusive forces at play were unknown or only vaguely understood.

Of the suggestions mentioned more frequently, the one having gained general favor is based on the idea of grounding the "lightning current" through horns, spaced a certain distance apart, and between which said "current" is allowed to jump.

That this idea, and its execution in practice, do not solve the problem at hand should be evident to any one witnessing the aftermaths of a thunder storm, in the form of burnt out transformers, terminal boxes, insulators and other electrical devices, even after the "lightning current" had been "seen" to be dissipated through the horns as a well-formed arc.

Consequently, after due investigation, it has been found that the damage, suffered by the high-tension transmission networks during storms, is not caused directly by the lightning surge proper but by the power of the line itself, said power being loosed over the line by disturbances therein initiated by the lightning stroke. As a result, the arc noticed as a rule between the horns of lightning arrestors is not necessarily the draining of the lightning surge, but the flowing to ground of the line current itself. What troubles can be caused by such a "grounding" of the line should be evident to any one versed in this art.

The present invention has been conceived as an improvement of the means generally employed for protection against lightning damage in high-tension transmission lines, the object being the filtering of dangerous lightning surges along said lines and the by-passing thereof to the ground through a leakage path, without causing ionization of said path.

It is also an objective of the invention to provide means for neutralizing ionized clouds present with high-frequency electric fields on transmission lines and generated by lightning strokes, said clouds being reflected and dissipated before ionizing the leakage path across which the line current itself could flow.

Consequently, as an application of the objectives supra, the means according to the invention prevent the striking of an arc causing flowing of the transmission power current to the ground, whereby breakdown of line insulators, terminal boxes, transformer stations, transformer terminals, windings and the like is avoided.

As an example, and for purposes of illustration only, practical forms of the invention are shown in the annexed drawings, wherein:

Fig. 1 is a side view of a power station showing an installation according to the invention and the lead-in means for a transmission line;

Fig. 2 is a vertical section taken on line 2—2 of Fig. 1;

Fig. 3 is a modified embodiment of the invention suitable for multi-phase lines; and Fig. 4 shows a further modification suitable for overhead installation.

This apparatus comprises, for each voltage line terminus H (Figs. 1, 3 and 4), a metal plate surface electrode A, held by one or several insulators I, and a metal plate surface electrode B, directly connected to the ground G. When seen in elevation, these two plate electrodes may be in the shape shown in Figs. 1 and 3, spread apart slightly at their upper extremities for the purpose of providing a slight upward curvature for a purpose which will be more fully described as this description progresses. The minimum spacing C, between the two plate electrodes, should correspond, at least, to the dielectric strength of the normal atmospheric air therebetween, for the potential of the line considered. This spacing, of course, varies in proportion to the line tension and, according to the invention, may be from 3 inches for 220 volts to 5 feet for 400,000 volts.

The surface of the plate electrodes A and B is determined in such a way that the density of the high frequency electromagnetic flux, per unit of the surface, set up between them in the case of a high frequency lightning discharge does not produce ionization of space C, so as to allow passage of the line voltage, and therefore does not initiate the arcing-over of this voltage to the ground, with consequent opening up of all the circuit breakers placed higher up on the line, the blowing of protection fuses and the breakdown of insulating parts. The lightning strokes are thus by-passed to the ground without causing arc-over between the line and the ground.

In practice, the surface of the plate electrodes

A and B varies from 1 square inch for 220 volts to 20 square feet for 400,000 volts, the two plates being relatively far away from each other, in accordance with the spacing data given above.

This lightning protector has the following features:

The line terminus H is anchored directly to the supporting collars S of the plate electrode A, to allow the lightning flux direct access to the apparatus positioned substantially perpendicularly to the line H, the plate electrode A acting as a baffle or screen without induction coil and condenser. No resistance, metallic, liquid or of any other nature, exists in the drainage circuit of the high frequency flux, the only resistance being formed by the air gap of thickness C between the plate electrodes A and B. The lead lines into station or other apparatus are shunted from the high voltage supply line H and connected thereto in the neighborhood of a right angle to be by-passed by the high frequency lightning fluxes which characteristically travel in a straight line substantially parallel to the transmission line terminated at H.

A reference to the drawings will indicate that the plate electrodes or sheets are preferably arranged substantially perpendicularly to the axes of the lines but that, at the same time, their surfaces are not parallel to each other. The reason for this is to provide a reflecting baffle on the transmission line which will act to reflect back along the line clouds of ionized gases which accompany the high frequency waves induced in said line by the lightning stroke. This keeps the gases away from the area between the two plates so that the air therebetween remains un-ionized.

As an additional precautionary measure, the two plates are not parallel to each other. In the construction shown in Figure 3, each plate makes an angle of approximately 20° from the vertical toward the top and 30° toward the bottom, while in Figure 4, each plate is placed at an angle of 20° from the vertical.

Thus it will be seen that the space between the plates forms a funnel allowing the ionized air of different density a passage upwardly, so should at the peak of a storm some ionized gases be accidentally admitted between the plates, they will rise immediately and no concentration of such ionized gases between the two plates will ever be allowed to become sufficient to cause arcing-over of the line voltage to the ground.

In this manner, the device shown and described herein performs two functions simultaneously. Firstly, the high frequency electromagnetic waves are by-passed to ground without producing an arc which would permit a discharge of the low frequency high voltage current from the line to the ground, and secondly, the sheet or plate electrode A acting as an isolated baffle, which is connected to the line, is arranged so as to provide a reflector reflecting ionized clouds of gases away from the area between the plate electrodes A and B.

The apparatus should always be placed outside the transformer stations, or other equipment, in the open air, which changes, to avoid ionization and to be able to lead off safely the high frequency electromagnetic waves. With this object in view, no part of the apparatus should be placed in a container or under a bell.

In the embodiment shown in Fig. 4, the plate electrodes A and B are arranged not exactly parallel to each other, the insulator supporting the line being placed between said electrodes.

As described above, the distance between the two plates varies from 3 inches to 5 or 6 feet and their surface from 1 square inch to 20 square feet. It thus becomes clear that there can be no question of capacity or capacitance between the two plates, and that the sole function of the first plate is to reflect back the ionized cloud, which follows the magnetic field of the line, and the function of the second plate is solely to drain to the ground the high frequency electrical fluxes or waves following lightning strokes.

From the foregoing, it will be readily appreciated that the invention is, in reality, a simple though effective and efficient advancement in the art of protecting high-tension transmission lines from the destructive forces induced therein by atmospheric disturbances, such as lightning.

Basically, the means of the invention consist in simple large-surface plate electrodes widely spaced-apart and disposed across the line to be protected and the ground, a characteristic feature of said plates being that they are substantially right-angular with respect to the line axis.

The arrangement above has been conceived in accordance with the observation that lightning strokes induce, in transmission lines, high-frequency electromagnetic waves travelling. linearly along the lines in axially parallel relation therewith, said lines acting as a sort of conducting core. Inherently associated with said electromagnetic fields are clouds of ionized air which, entering horns gaps ionize same and, accordingly, tend to permit the line voltage to jump therethrough and strike a destructive arc.

Consequently, according to the invention, the large surface plate electrodes are spaced apart at least the distance required by the dielectric strength of the air therebetween, whereby the normal potential of the line cannot jump across. The surface of said plates must be such that they act as a barrier for the ionized clouds and the ion concentration therebetween, per unit of surface, is at no time sufficient to decrease appreciably the dielectric strength below the optimum value noted above.

Thus, there can be no question of capacity between said plates, as far as measurable values are considered, the effectiveness of the means of the invention not being dependent upon capacitance as such.

Obviously, modifications of degree are possible in the size, shape and arrangement of parts, without departing from the spirit of the invention or the scope of the subjoined claims.

I claim:

1. In means for protecting electric transmission lines and associated devices against damage by atmospheric discharges, an electrically conductive plate of relatively large surface proportionate to the voltage of the line and sufficient to reflect ionized gases accompanying the high frequency atmospheric discharge, said plate being connected to a line to be protected in substantially right-angular cross relation thereto, a second similar plate disposed in facing approximately parallel position with respect to the first plate, said second plate being directly grounded and spaced from said first plate at a distance such that the dielectric strength of the normal air therebetween is above the puncturing force of the line potential, and a feeder line connected substantially perpendicularly to the line and extending for connection to the line-associated devices.

2. Lightning protection means for high-tension transmission lines and associated devices, a pair of spaced substantially parallel conducting plates disposed across and nearly perpendicularly with respect to a line to be protected, one of said plates being grounded and the other connected to the line, said plates having a surface sufficient to reflect ionized gases accompanying the high frequency atmospheric discharge both said plates being spaced so that the strength of the air dielectric therebetween is above the puncturing force of the line potential, the surface of said plates being such that the ion concentration of the intervening air per unit of surface is always below the point at which the dielectric strength is reduced below its optimum safe value for the line potential and a feeder line connected substantially perpendicularly to the line and extending for connection to the associated devices.

3. In lightning protection means as claimed in claim 2, the distance between the plates being comprised between 3 inches for 220 volts and 5 feet for 400,000 volts, the surface of said plates varying in direct ratio with the voltages handled from 1 square inch to 20 square feet.

4. An apparatus for the protection of low frequency electrical installation against atmospheric discharges of relatively high frequency comprising a sheet mounted on an insulator to be insulated from ground, a current supply line terminated at said sheet, a feeder line connected approximately perpendicularly to said supply line and extending for connection to the electrical installation, said sheet being positioned substantially perpendicular to the supply line and having an area proportionate to the line voltage and sufficient to reflect ionized gases which accompany the high frequency atmospheric discharge.

5. An apparatus for the protection of low frequency electrical installations against atmospheric discharges of relatively high frequency comprising an electrically conductive sheet mounted on an insulator to be insulated from ground, an industrial current supply line terminated at and connected to said sheet, a feeder line connected approximately perpendicularly to said supply line and extending for connection to the electrical installation, said sheet being positioned substantially perpendicular to the supply line and having an area proportionate to the line voltage sufficient to reflect ionized gases which accompany the high frequency atmospheric discharge.

6. An apparatus for the protection of low frequency electrical installations against atmospheric electromagnetic waves of relatively high frequency comprising a sheet of electrically conductive material mounted on an insulator to be insulated from ground, an industrial current supply line terminated at said sheet, a feeder line connected approximately perpendicularly to said supply line and extending for connection to the electrical installation and a second electrically conductive sheet spaced from and not exactly parallel to the first mentioned sheet, said second sheet being connected to ground, the spacing between the sheets being proportionate to the voltage of the supply line and sufficient to prevent a discharge of the said low frequency current from the supply line, said sheets being positioned substantially perpendicular to the supply line, and having areas proportionate to the voltage of the supply line and sufficiently large to bypass to ground surge energy from atmospheric high frequency electromagnetic waves, and the sheet connected to the supply line being arranged substantially perpendicular thereto to reflect away from the area between the two sheets ionized gases which accompany the high frequency electromagnetic waves.

JÉRÔME COUGNARD.

REFERENCES CITED

The following references are of record in the file of this patent:

UNITED STATES PATENTS

| Number | Name | Date |
|---|---|---|
| 1,236,563 | Holmgren | Aug. 14, 1917 |
| 1,744,353 | Austin | Jan. 21, 1930 |
| 1,773,014 | Seslar | Aug. 12, 1930 |
| 1,778,891 | Earnhardt | Oct. 21, 1930 |
| 1,923,564 | Austin | Aug. 22, 1933 |
| 2,394,937 | Pittman | Feb. 12, 1946 |

FOREIGN PATENTS

| Number | Country | Date |
|---|---|---|
| 15,580 of 1914 | Great Britain | Mar. 9, 1916 |
| 131,778 | Germany | June 21, 1902 |